(12) United States Patent
Johnson et al.

(10) Patent No.: US 11,396,122 B2
(45) Date of Patent: Jul. 26, 2022

(54) NOZZLE SHAFT ASSEMBLY

(71) Applicant: AMCOR RIGID PACKAGING USA, LLC, Ann Arbor, MI (US)

(72) Inventors: David M. Johnson, Saline, MI (US); G. David Lisch, Jackson, MI (US)

(73) Assignee: AMCOR RIGID PACKAGING USA, LLC, Ann Arbor, MI (US)

( * ) Notice: Subject to any disclaimer, the term of this patent is extended or adjusted under 35 U.S.C. 154(b) by 0 days.

(21) Appl. No.: 17/049,781

(22) PCT Filed: Apr. 25, 2018

(86) PCT No.: PCT/US2018/029321
§ 371 (c)(1),
(2) Date: Oct. 22, 2020

(87) PCT Pub. No.: WO2019/209284
PCT Pub. Date: Oct. 31, 2019

(65) Prior Publication Data
US 2021/0237328 A1 Aug. 5, 2021

(51) Int. Cl.
*B29C 49/46* (2006.01)
*B29C 49/58* (2006.01)
(Continued)

(52) U.S. Cl.
CPC .............. *B29C 49/06* (2013.01); *B29C 49/12* (2013.01); *B29C 49/46* (2013.01); *B29B 2911/1444* (2013.01); *B29L 2031/7158* (2013.01)

(58) Field of Classification Search
CPC .............. B29C 49/46; B29C 2049/465; B29C 2049/4655; B29C 2049/4664; B29C 2049/5803; B29C 2049/5893
See application file for complete search history.

(56) References Cited

U.S. PATENT DOCUMENTS

2009/0108506 A1 4/2009 Leone
2012/0093965 A1 4/2012 Lisch et al.
(Continued)

FOREIGN PATENT DOCUMENTS

JP 2012-183738 A 9/2012
KR 101554270 B1 9/2015

OTHER PUBLICATIONS

International Search Report and Written Opinion of the International Searching Authority, issued in PCT/US2018/029321, dated Jan. 25, 2019; ISA/KR.

(Continued)

*Primary Examiner* — Robert B Davis
(74) *Attorney, Agent, or Firm* — Harness, Dickey & Pierce, P.L.C.

(57) ABSTRACT

The present disclosure includes a forming and filling head for simultaneously forming and filling a polymeric container with liquid. The forming and filling head includes a nozzle shaft assembly having a first portion removably engaged with a second portion. The nozzle shaft assembly defines a through-bore extending through each one of the first portion and the second portion. An annular seal is within the through-bore and is seated at one of the first portion and the second portion to permit access to the annular seal when the first portion and the second portion are disengaged. Flow ports are defined by a wall of the nozzle shaft assembly. The flow ports extend from an exterior of the nozzle shaft assembly to the through-bore to direct the liquid for forming and filling the polymeric container into the through-bore.

10 Claims, 6 Drawing Sheets

(51) Int. Cl.
*B29C 49/06* (2006.01)
*B29C 49/12* (2006.01)
*B29L 31/00* (2006.01)

(56) References Cited

U.S. PATENT DOCUMENTS

| | | | |
|---|---|---|---|
| 2012/0114783 A1 | 5/2012 | Lambert | |
| 2015/0328824 A1 | 11/2015 | Morikami et al. | |
| 2016/0144550 A1* | 5/2016 | Kumar | B29C 49/58 |
| | | | 264/524 |
| 2018/0326649 A1* | 11/2018 | Lisch | B29C 49/58 |
| 2020/0171737 A1* | 6/2020 | Lisch | B29C 49/78 |

OTHER PUBLICATIONS

Supplementary European Search Report issued in corresponding European patent application No. 18916135.9 dated Oct. 15, 2021 (7 pages).

* cited by examiner

NOZZLE SHAFT ASSEMBLY

CROSS-REFERENCE TO RELATED APPLICATION

This application is a 371 U.S. National Phase of International Application No. PCT/US2018/029321, filed Apr. 28, 2018, the entire disclosure of which is incorporated herein by reference.

FIELD

The present disclosure relates to a forming and filling head for simultaneously forming and filling a polymeric container with liquid.

BACKGROUND

This section provides background information related to the present disclosure, which is not necessarily prior art.

Forming and filling machines for simultaneously forming and filling a polymeric container from a preform are known. Such machines include one or more forming and filling heads, which cooperate directly with container preforms to form and fill containers from the preforms. Each forming and filling head typically includes a nozzle shaft with a seal therein. The seal forms a liquid-tight seal with a nozzle sleeve to prevent liquid from flowing across the seal. Current nozzle shafts are monolithic (i.e., one-piece units) with the seal arranged at about a midpoint along a length of a through-bore defined by the nozzle shaft. This makes it very difficult, if not impossible, to replace a worn or damaged seal. An improved forming and filling head configured to facilitate replacement or servicing of a damaged or misaligned seal would therefore be desirable. The present disclosure advantageously provides for a forming and filling head having a nozzle shaft assembly that provides such advantages, as well as numerous others as explained in detail herein, and as one skilled in the art will appreciate.

SUMMARY

This section provides a general summary of the disclosure, and is not a comprehensive disclosure of its full scope or all of its features.

The present disclosure includes a forming and filling head for simultaneously forming and filling a polymeric container with liquid. The forming and filling head includes a nozzle shaft assembly having a first portion removably engaged with a second portion. The nozzle shaft assembly defines a through-bore extending through each one of the first portion and the second portion. An annular seal is within the through-bore and is seated at one of the first portion and the second portion to permit access to the annular seal when the first portion and the second portion are disengaged. Flow ports defined by a wall of the nozzle shaft assembly. The flow ports extend from an exterior of the nozzle shaft assembly to the through-bore to direct the liquid for forming and filling the polymeric container into the through-bore.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of select embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
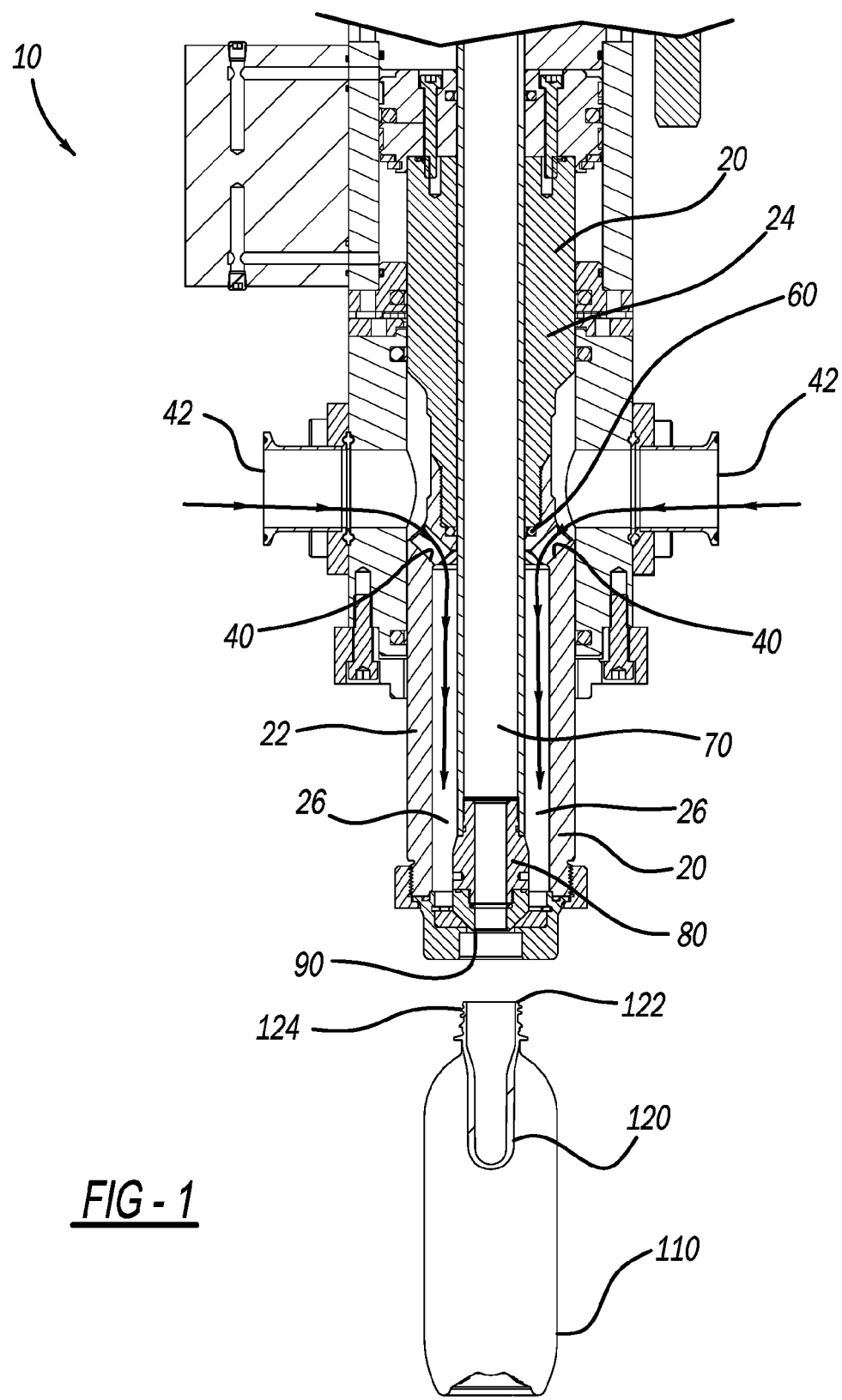
FIG. 1 is a cross-sectional view of a forming and filling head in accordance with the present disclosure.

With initial reference to FIG. 1, a forming and filling head in accordance with the present disclosure is illustrated at reference numeral 10. The forming and filling head 10 is for use with any suitable machine for simultaneously filling and forming a polymeric container 110 from a container preform 120. FIG. 1 illustrates an exemplary preform finish 122 of the preform 120. The preform finish 122 includes threads 124, which are configured to cooperate with threads of any suitable closure (e.g., cap) for closing the container 110 formed from the preform 120. The preform 120 and resulting container 110 can be formed of any suitable polymeric material, such as polyethylene terephthalate, low-density polyethylene, high-density polyethylene, polypropylene, and polystyrene, for example. To form and fill the container 110, any suitable liquid is injected by the forming and filling head 10 through the preform finish 122 and into the preform 120, such as water, any beverage, any food, and any suitable non-food liquid product.

The forming and filling head 10 generally includes a nozzle shaft assembly 20, a nozzle sleeve 70 extending through the nozzle shaft assembly 20, and a nozzle 80 mounted to the nozzle sleeve 70. The nozzle sleeve 70 is movable along a longitudinal axis of the forming and filling head 10 in order to move the nozzle 80 away from, and towards, an outlet 90 to open and close the outlet 90 to control the flow of liquid to the preform 120. As described further herein, liquid for forming and filling the container 110 is introduced into the forming and filling head 10 through inlets 42 thereof.

Figure 2:
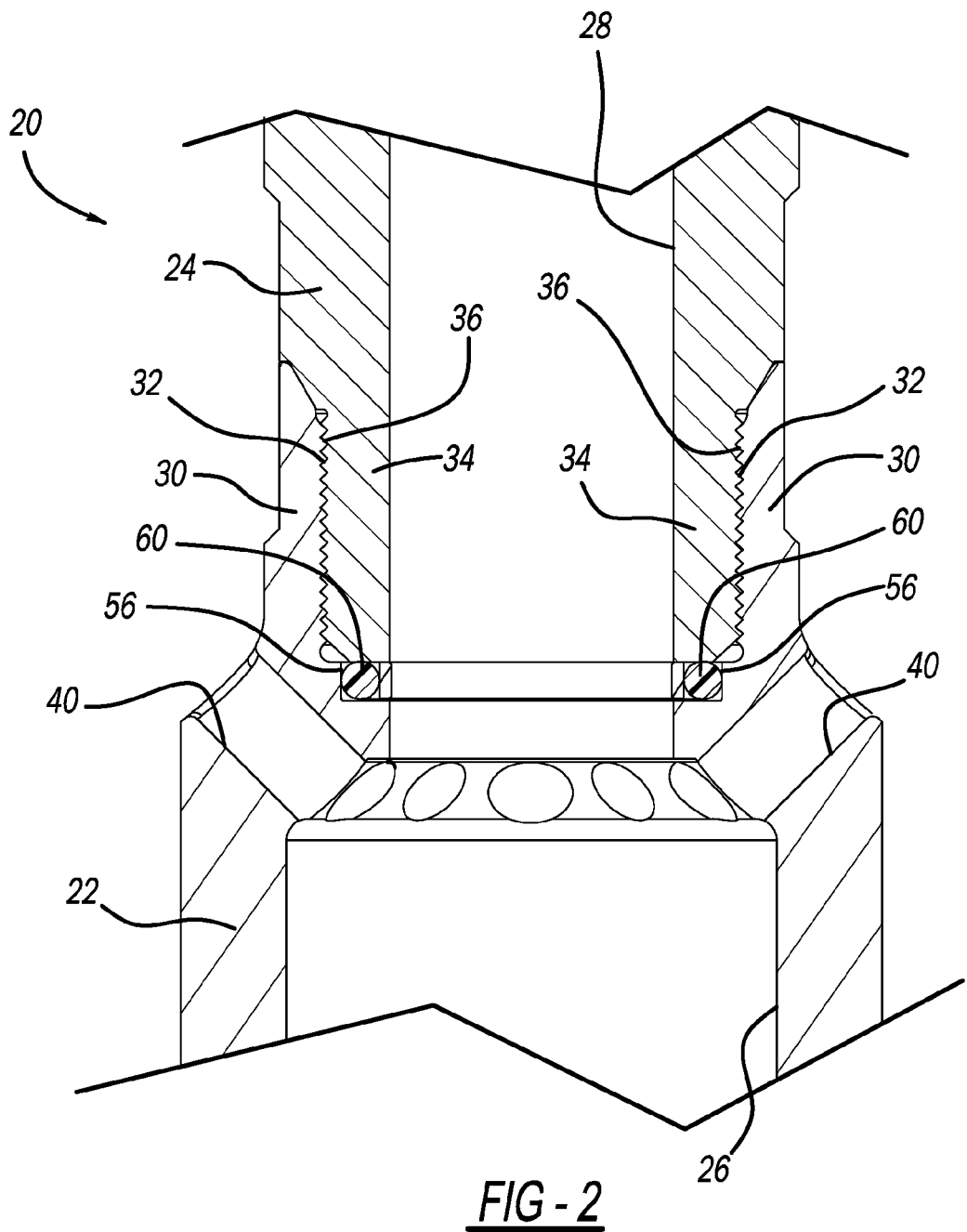
FIG. 2 is a cross-sectional view of a nozzle shaft assembly of the forming and filling head of FIG. 1.
Figure 3:
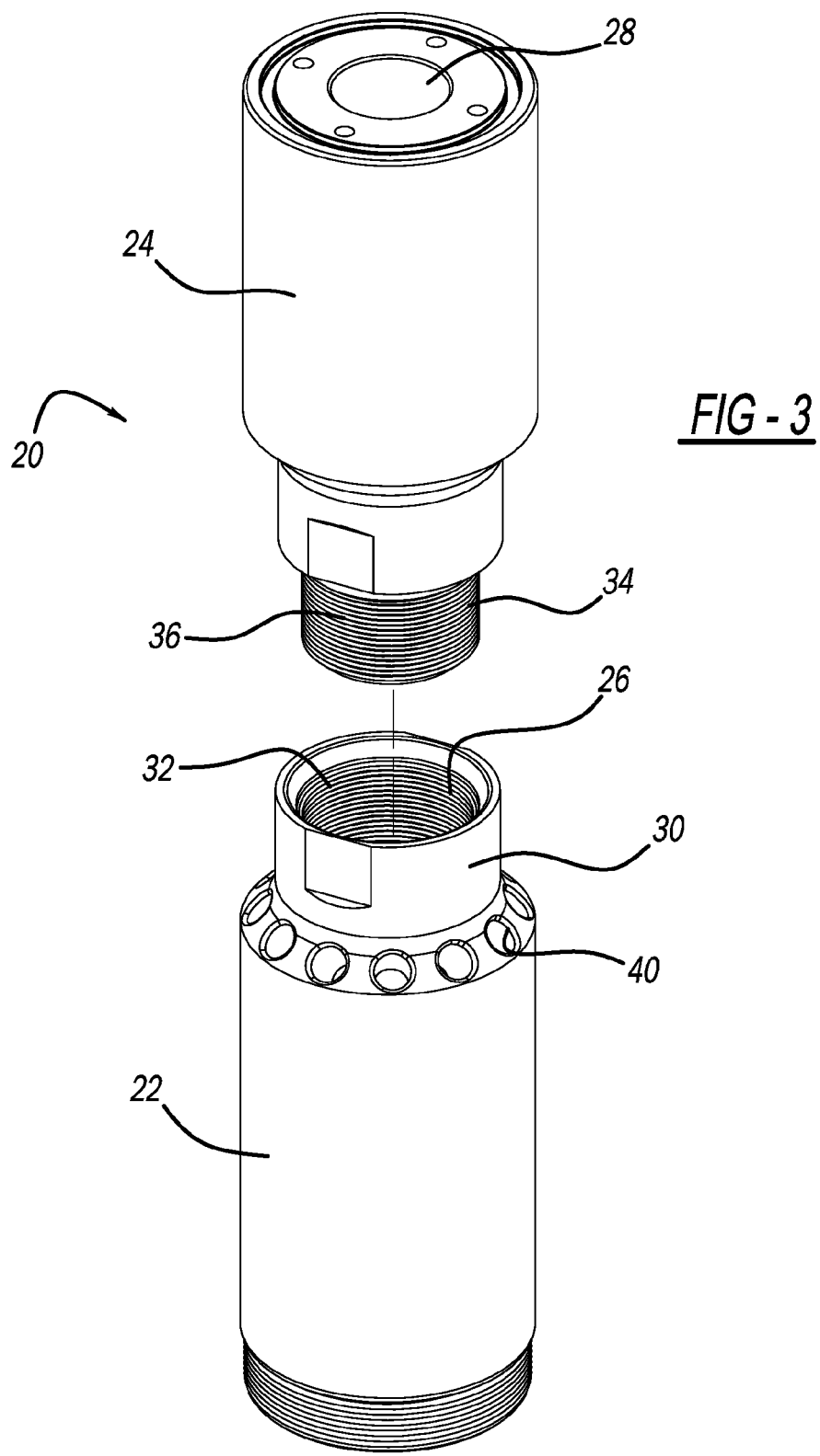
FIG. 3 is a perspective view of the nozzle shaft assembly of the forming and filling head of FIG. 1.

With continued reference to FIG. 1, and additional reference to FIGS. 2 and 3, the nozzle shaft assembly 20 will now be described in further detail. The nozzle shaft assembly 20 includes a first portion 22 and a second portion 24, which are removably coupleable together. The first portion 22 defines a first part 26 of a through-bore (or first through-bore), and the second portion 24 defines a second part 28 of the through-bore (or second through-bore), which extends through the nozzle shaft assembly 20. The first portion 22 further includes a first flange 30 having any suitable first coupler for coupling the first portion 22 to the second portion 24. For example and as illustrated, the first coupler can be first threads 32. The second portion 24 includes a second flange 34 having any suitable second coupler, such as second threads 36 configured to cooperate with the first threads 32. Thus the first portion 22 and the second portion 24 are removably coupleable together to permit access to contents of the first part 26 and the second part 28 of the through-bore, and particularly to a seal 60.

The first portion 22 of the nozzle shaft assembly 20 further includes one or more flow ports 40 extending through a wall of the nozzle shaft assembly 20. The flow ports 40 provide fluid communication between an exterior of the first portion 22 and the first part 26 of the through-bore. As illustrated in FIG. 1, the flow ports 40 are aligned with the inlets 42 to allow the forming and filling liquid to flow from the inlets 42 into the first part 26 of the through-bore, and ultimately through the outlet 90 and to the preform 120.

The first portion 22 includes any suitable holder for the seal 60, such as a seal groove 56. When the second portion 24 is separated from the first portion 22 (as illustrated in FIG. 3), the seal 60 may be easily accessed to service or replace the seal 60. The nozzle sleeve 70 is positioned such that it extends through and contacts the seal 60 to provide a liquid-tight seal between the nozzle sleeve 70 and the seal 60 to prevent the filling and forming liquid from passing across the seal 60. The seal 60 can be any suitable sealing device, such as an annular, elastomeric seal.

Figure 4:
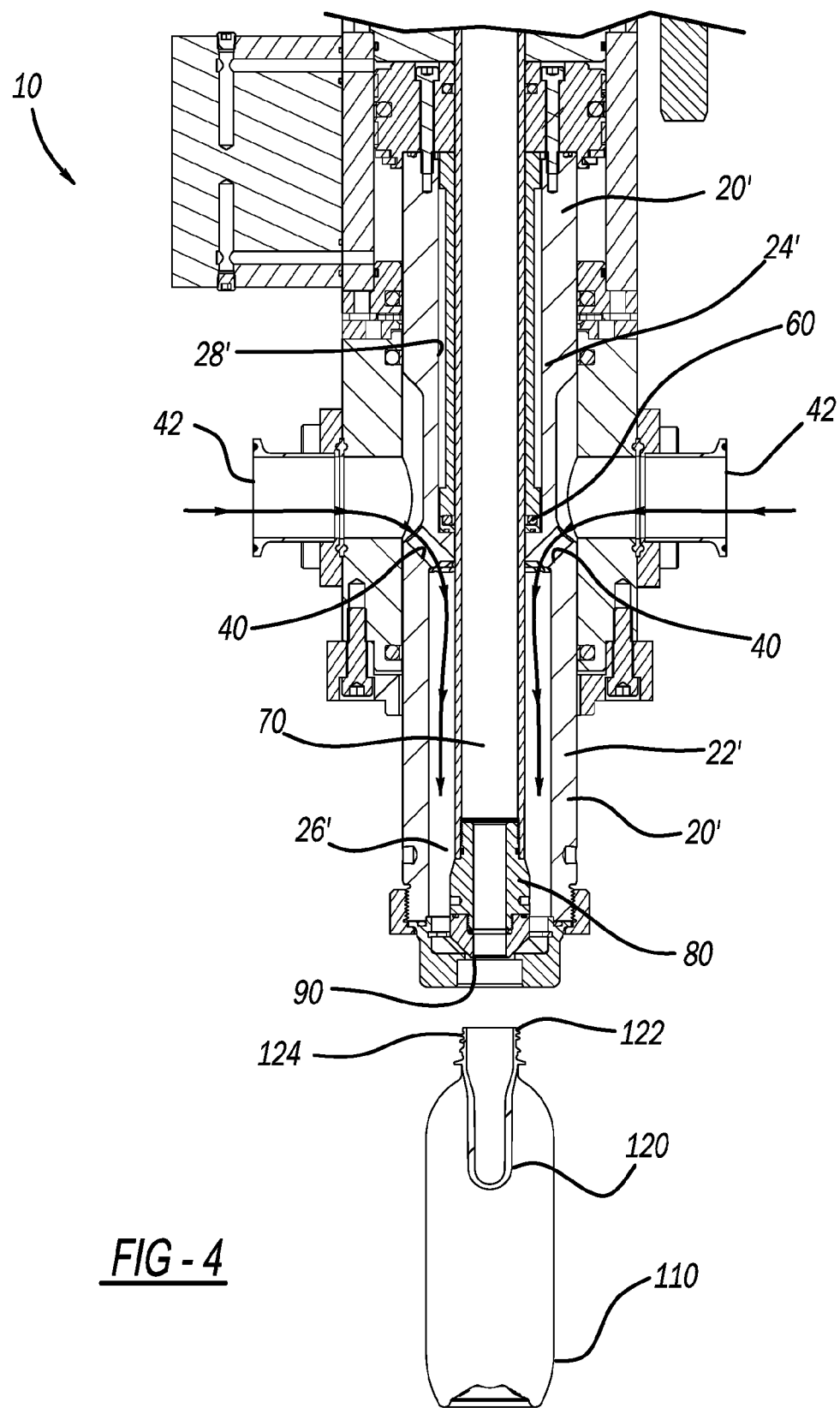
FIG. 4 is a cross-sectional view of the forming and filling head including another nozzle shaft assembly in accordance with the present disclosure.
Figure 5:
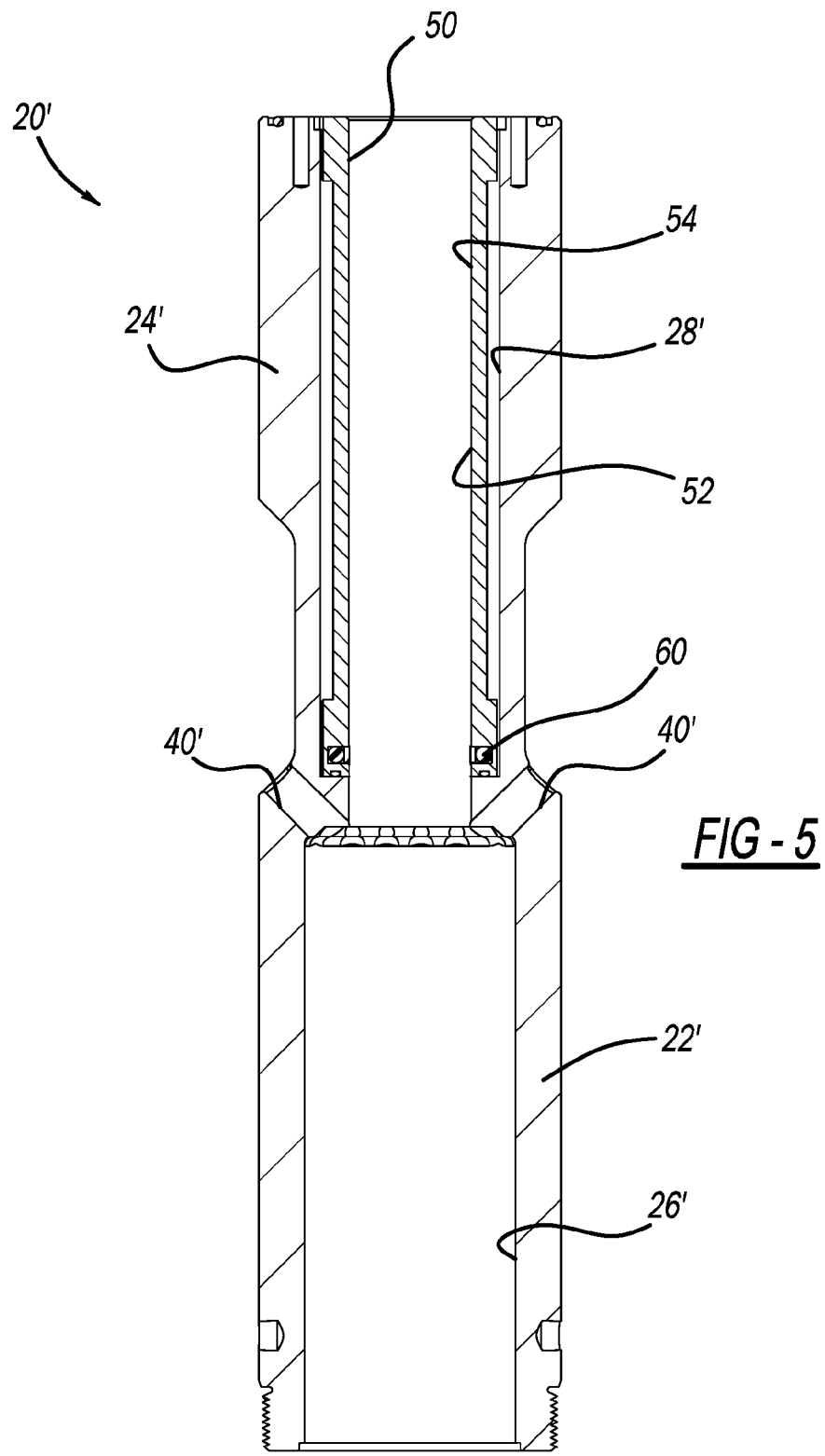
FIG. 5 is a cross-sectional view of the nozzle shaft assembly of the forming and filling head of FIG. 4.

FIG. 4 illustrates the forming and filling head 10 including another nozzle shaft assembly in accordance with the present disclosure at reference numeral 20'. FIG. 5 illustrates the nozzle shaft assembly 20' apart from the forming and filling head 10. Unlike the nozzle shaft assembly 20, the first portion 22' and the second portion 24' are integral with one another to provide a one-piece or monolithic structure. Like the nozzle shaft assembly 20, the nozzle shaft assembly 20' includes flow ports 40'. Other features of the nozzle shaft assembly 20' that are the same as, or similar to, the nozzle shaft assembly 20 are illustrated in FIGS. 4-6B with the same reference numbers, but with the prime (') designation. The description of such common features set forth above in the description of the nozzle shaft assembly 20 also applies to the nozzle shaft assembly 20'.

With reference to FIGS. 4, 5, 6A, and 6B, unlike the nozzle shaft assembly 20, the nozzle shaft assembly 20' includes a nozzle shaft sleeve 50, which is removably seated within the second portion 24'. Thus, the unitary nozzle shaft assembly 20' is a first portion and the nozzle shaft sleeve 50 is a second portion that removably engages the nozzle shaft sleeve 50 (first portion). The nozzle sleeve 70 extends through the nozzle shaft sleeve 50.

Figure 6A:
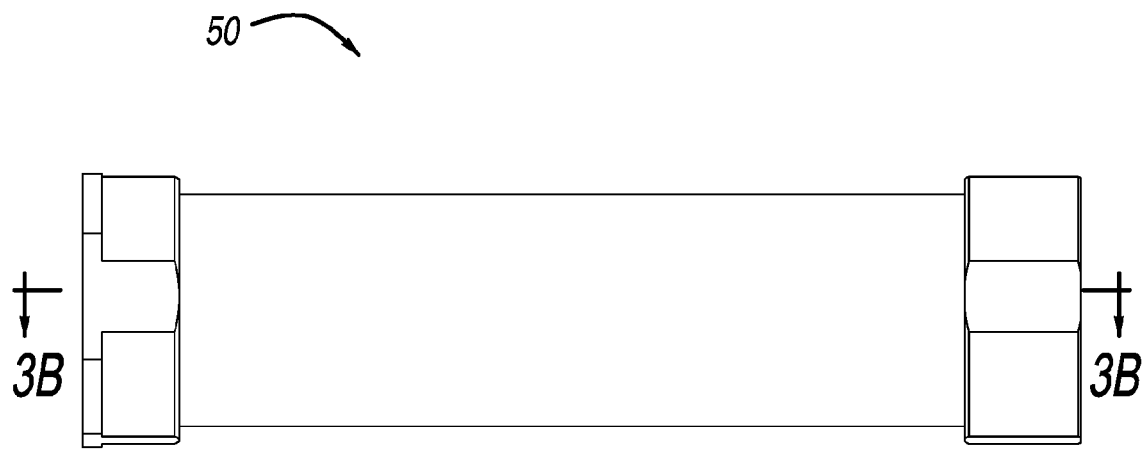
FIG. 6A is a side view of a nozzle shaft sleeve for the nozzle shaft assembly of FIG. 4.
Figure 6B:
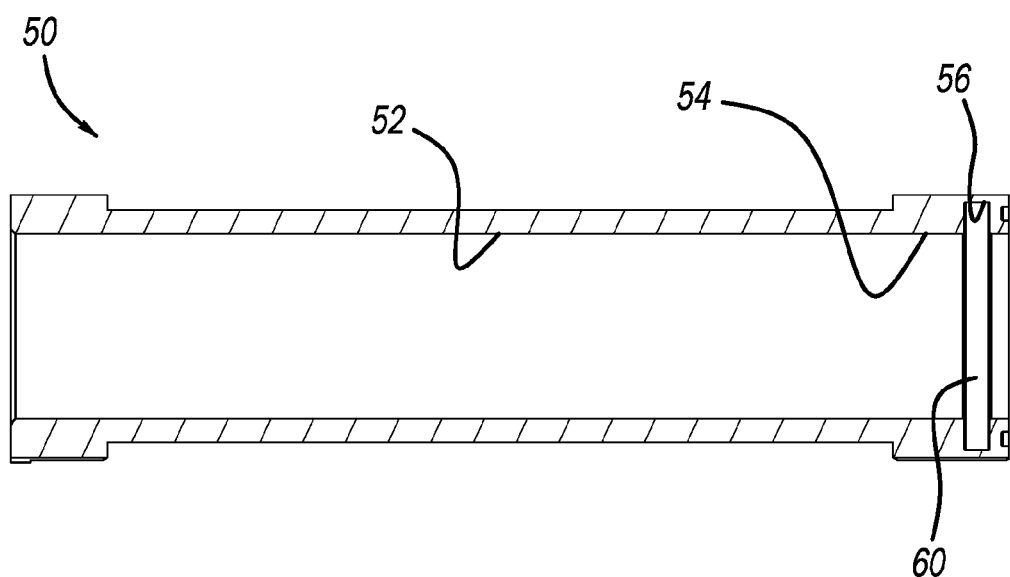
FIG. 6B is a cross-sectional view taken along line 6B-6B of FIG. 6A.

With reference to FIGS. 6A and 6B, the nozzle shaft sleeve 50 defines a sleeve through bore 52 extending therethrough. At an interior wall surface 54 of the through-bore 52 is any suitable holder for the seal 60, such as a seal groove 56. The nozzle shaft sleeve 50 is seated in the second part 28' of the through-bore of the nozzle shaft assembly 20' such that when the nozzle shaft sleeve 50 is removed from within the second portion 24' of the nozzle shaft assembly 20', the seal 60 may be easily accessed to service or replace the seal 60. The nozzle sleeve 70 is positioned such that it extends through the sleeve through-bore 52 and contacts the seal 60 to provide a liquid tight seal between the nozzle sleeve 70 and the seal 60 to prevent the filling and forming liquid from passing across the seal 60.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A forming and filling head for simultaneously forming and filling a polymeric container with liquid, the forming and filling head comprising:
    a nozzle shaft assembly including a first portion removably engaged with a second portion, the nozzle shaft assembly defines a through-bore extending through each of the first portion and the second portion;
    an annular seal within the through-bore and seated at one of the first portion and the second portion to permit access to the annular seal when the first portion and the second portion are disengaged; and
    flow ports defined by a wall of the nozzle shaft assembly, the flow ports extending from an exterior of the nozzle shaft assembly to the through-bore to direct the liquid for forming and filling the polymeric container into the through-bore;
    wherein the first portion and the second portion are threadably engagable with one another; and
    wherein the second portion is a nozzle shaft sleeve removably seated in the through-bore, the annular seal is seated on the nozzle shaft sleeve.

2. The forming and filling head of claim 1, wherein the nozzle shaft sleeve defines a sleeve through-bore through which a nozzle shaft of the forming and filling head extends.

3. The forming and filling head of claim 1, further comprising a nozzle sleeve that is connected to a nozzle and is vertically movable to open and close an outlet of the forming and filling head.

4. The forming and filling head of claim 1, wherein the seal is seated in a seal groove defined by one of the first portion and the second portion.

5. The forming and filling head of claim 1, wherein the polymeric container is a polyethylene terephthalate container.

6. The forming and filling head of claim 1, wherein the liquid includes water, a beverage, or food.

7. A forming and filling head for simultaneously forming and filling a polymeric container with liquid, the forming and filling head comprising:
    a nozzle shaft assembly defining a through-bore and flow ports extending from an exterior of the nozzle shaft assembly to the through-bore to direct liquid into the through-bore;
    a nozzle shaft sleeve removably seated within the through-bore, the nozzle shaft sleeve defining a sleeve bore and including an annular seal extending around an interior of the sleeve bore;
    a nozzle sleeve seated within the sleeve bore, the annular seal seals against the nozzle sleeve; and
    a nozzle coupled to the nozzle sleeve, the nozzle is vertically movable by the nozzle sleeve to open and close an outlet of the forming and filling head through which liquid for forming and filling the container flows.

8. The forming and filling head of claim 7, wherein the seal is seated in a seal groove defined by the nozzle shaft sleeve.

9. The forming and filling head of claim 7, wherein the polymeric container is a polyethylene terephthalate container.

10. The forming and filling head of claim 7, wherein the liquid includes water, a beverage, or food.

* * * * *